(12) United States Patent
Fleischer et al.

(10) Patent No.: US 6,221,321 B1
(45) Date of Patent: Apr. 24, 2001

(54) CHEMICAL FEEDER

(75) Inventors: Gene S. Fleischer, New City; David Ulman, Bronx, both of NY (US)

(73) Assignee: H-Tech, Inc., Wilmington, DE (US)

( * ) Notice: Subject to any disclaimer, the term of this patent is extended or adjusted under 35 U.S.C. 154(b) by 0 days.

(21) Appl. No.: 09/190,672

(22) Filed: Nov. 12, 1998

Related U.S. Application Data
(60) Provisional application No. 60/065,344, filed on Nov. 12, 1997.

(51) Int. Cl.$^7$ .................................................. B01D 17/00
(52) U.S. Cl. ...................... 422/282; 210/198.1; 210/205; 422/262; 422/267; 422/279
(58) Field of Search .................................. 422/262, 267, 422/279, 282; 210/198.1, 205, 237, 241

(56) References Cited

U.S. PATENT DOCUMENTS

| | | |
|---|---|---|
| 2,113,203 | 4/1938 | Straubel . |
| 3,195,558 | 7/1965 | Klueber et al. . |
| 3,474,817 * | 10/1969 | Bates et al. ........................... 422/282 |
| 3,482,740 | 12/1969 | Evans et al. . |
| 4,333,493 | 6/1982 | Beiswenger et al. . |
| 4,350,666 | 9/1982 | Klutts . |
| 4,402,913 | 9/1983 | Krueger et al. . |
| 4,584,106 | 4/1986 | Held . |
| 4,691,732 | 9/1987 | Johnson et al. . |
| 5,076,315 * | 12/1991 | King ...................................... 422/282 |
| 5,133,381 * | 7/1992 | Wood et al. .......................... 137/268 |
| 5,192,431 * | 3/1993 | Holmes .............................. 210/198.1 |
| 5,218,983 | 6/1993 | King . |
| 5,225,074 | 7/1993 | Moini . |
| 5,251,656 | 10/1993 | Sexton, Sr. . |
| 5,350,512 | 9/1994 | Tang . |
| 5,405,540 | 4/1995 | Tang . |
| 5,507,945 | 4/1996 | Hansen . |
| 5,743,287 * | 4/1998 | Rauchwerger ....................... 137/268 |
| 5,976,385 | 11/1999 | King ..................................... 210/754 |

* cited by examiner

Primary Examiner—Krisanne Thornton
(74) Attorney, Agent, or Firm—Selitto & Associates

(57) ABSTRACT

A chemical feeder for use in a water circulation system includes a body, a head attached to the top of the body, and a flow passage extending through the head. A portion of the water flowing through the flow passage is diverted into the body, where the water mixes with chemical tablets contained therein. A strainer is positioned inside the body and a stand pipe connects the strainer to the flow passage. Venturi forces within the flow passage draw the chemical solution from the body and into the flow passage, where the chemical solution mixes with the water flowing therethrough. It is possible to control the concentration of the chemical solution by controlling the flow of fluid from the flow passage into the body.

9 Claims, 3 Drawing Sheets

CHEMICAL FEEDER

CROSS-REFERENCE TO RELATED APPLICATIONS

This is a §111(a) application relating to U.S. application Ser. No. 60/065,344 filed Nov. 12, 1997.

FIELD OF THE INVENTION

The present invention relates to a chemical feeder, and more particularly, to a chemical feeder which is especially adapted for use as a chlorinator for swimming pools and the like.

BACKGROUND OF THE INVENTION

In a water circulation system, several different devices are connected together to properly treat the water. For example, one of the following four configurations of the various components is generally used in conjunction with a swimming pool water circulation system:

(1) a pump, a filter, a heater, and a chlorinator, connected in series, in that order;

(2) a pump, a filter, and a chlorinator, connected in series, in that order;

(3) a pump and a filter connected in series, with a heater and a chlorinator connected to the filter in parallel; and (4) a pump, with a filter and a chlorinator connected to the pump in parallel (however, this combination is the least desirable, as all the water is not filtered).

In any of the above configurations, it is usually necessary to insert a check valve into the system upstream of the chlorinator to prevent concentrated chlorine solution from bleeding back upstream from the chemical feeder into the circulation system. A check valve is usually necessary because the chemical feeders of the prior art are constructed such that the inlet and outlet ports are typically located near the bottom of the chemical feeder. This location for the inlet and outlet ports creates a problem because as water flows through the chemical feeder, the water is mixed with the chemical tablets in the lower portion of the feeder, creating a concentrated solution that is located near both the inlet port and the outlet port.

In a swimming pool water circulation system using chlorine tablets in the chemical feeder, the concentrated solution is chlorinated water, which is heavier than regular water and tends to sink toward the bottom of the chemical feeder. In addition, the less-chlorinated water column located above the more-chlorinated water creates a pressure head on the more-chlorinated water. This pressure head is in proportion to the size of the water column; i.e., large chemical feeders allow for large water pressure heads which create a higher pressure on the more-chlorinated water. The net effect is that gravity and the pressure created by the pressure head act to force the more-chlorinated water from the bottom of the feeder and into the outlet flow of the feeder. But because both the inlet and the outlet are located at the bottom of the feeder, the more-chlorinated water has a tendency to bleed back through the inlet and into the upstream water flow. This problem is especially prevalent when the system is not running.

Having the more-chlorinated water flow back upstream is detrimental to the overall water circulation system, in that it can damage the upstream system parts, including corroding the copper contained within a heater. While the upstream bleeding may be of small volume, it is still a concentrated solution, and the damage caused thereby can be significant.

One example of this type of device is Hayward Pool Products, Inc.'s model CL-200 In-Line Chlorinator. This chlorinator has an inlet and an outlet located at the bottom of the body of the device. The top cap of the device is removed and chlorine tablets are placed into the hollow interior of the body. When in operation, highly chlorinated water will be at the bottom of the device, which could lead to the upstream bleeding problem described above.

A device that has water flowing through its top, as opposed to its bottom, is disclosed in U.S. Pat. No. 5,507,945. The device disclosed in the '945 patent employs a cap attached on top of a canister, with a flow conduit extending through the cap. A solid chemical is placed into a container, which is positioned inside the canister. As water flows through the conduit, a small portion is directed into the canister. As the canister fills with water, some of the water enters the container, dissolving the solid chemical. The resulting chemical solution is taken from the top of the container by venturi forces within the conduit.

There is presently a need in the art for a chemical feeder that reduces the backflow problem described above. The present invention satisfies that need and, in many applications, may eliminate the need to install a separate check valve upstream of the chemical feeder.

SUMMARY OF THE INVENTION

A chemical feeder constructed in accordance with the present invention consists of a substantially hollow body and a substantially hollow head releasably attached to the body. The head is provided with an inlet, an outlet, and a venturi-like flow passage extending through the head, connecting the inlet to the outlet. Beginning at the inlet, the flow passage narrows in a frusto-conical inlet section, leading to a centrally located cylindrical section, and from there, widens in a frusto-conical outlet section ending at the outlet.

A bypass opening is positioned in the frusto-conical inlet section, near the inlet, and feeds into a bypass passage. A bypass outlet is located along the bypass passage, permitting fluid communication between the bypass passage and the interior of the head. A feeder nozzle, which opens into a feeder tube, is positioned in the cylindrical section of the flow passage. The feeder tube is connected to a stand pipe, which ends at a strainer positioned adjacent to the bottom of the interior of the body.

In operation, chemical tablets are placed inside the body interior, around the strainer. As water flows through the flow passage, a small portion is diverted from the frusto-conical inlet section through the bypass opening, and into the bypass passage. The diverted water flows out of the bypass passage through the bypass outlet, into the head interior, and down into the body interior, where the collected water dissolves the chemical tablets, forming a concentrated solution.

As the non-diverted portion of the water in the flow passage flows through the frusto-conical inlet section and into the cylindrical section, its velocity is increased, creating a low pressure condition within the cylindrical section. This low pressure condition permits the concentrated solution in the body interior, which is at a higher pressure than the water flowing through the cylindrical section, to flow through the strainer, up the stand pipe and feeder tube, through the feeder nozzle and into the cylindrical section, where the concentrated solution mixes with the water flowing through the flow passage. This mixture then flows through the frusto-conical outlet section and out of the chemical feeder through the outlet.

BRIEF DESCRIPTION OF THE DRAWINGS

For a better understanding of the present invention, reference is made to the following detailed description of an exemplary embodiment considered in conjunction with the accompanying drawings, in which.

DETAILED DESCRIPTION OF THE INVENTION

Figure 1:
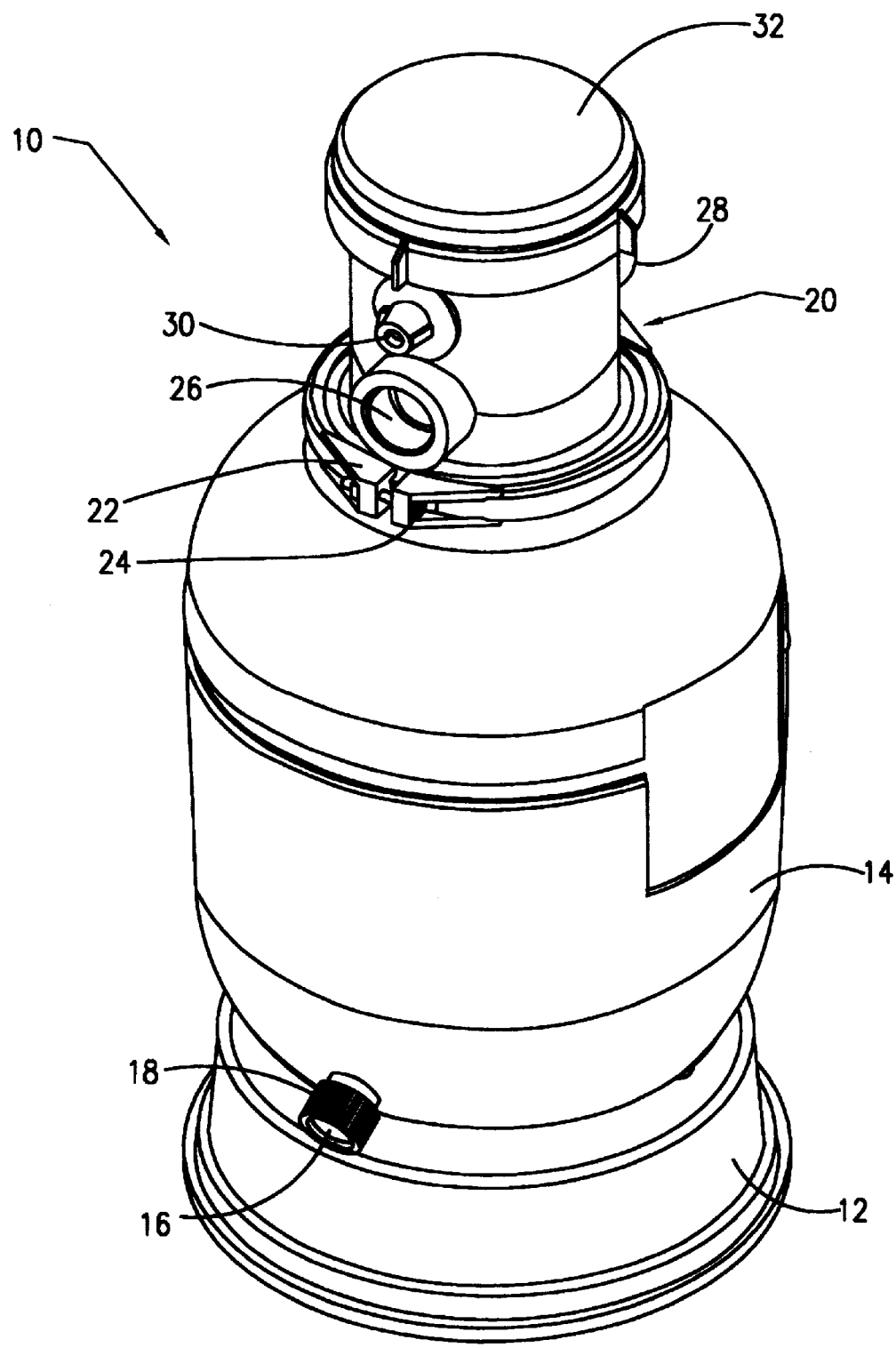
FIG. 1 is a perspective view of a chemical feeder constructed in accordance with an exemplary embodiment of the present invention.

FIG. 1 shows a chemical feeder 10 for feeding a chemical solution into a water circulation system. The chemical feeder 10 has a base 12 which supports a hollow body 14 constructed of an ultra-high molecular weight polyethylene, which is designed to resist corrosion caused by the chemicals contained within the chemical feeder 10. The body 14 has a downwardly directed drain opening 16 which is closed by a removable drain cap 18. A substantially hollow head 20 is releasably attached to the body 14 by a flange clamp 22 and screws 24.

The head 20 contains an inlet 26 and an outlet 28, with the inlet 26 being located on a diametrically opposed side of the head 20 from the outlet 28. A rotatable valve knob 30, for controlling the concentration of chemical solution within the chemical feeder 10, is located in the head 20 above the inlet 26. A removable top cap 32, allowing access to the interior of the chemical feeder 10, is threadedly attached to the upper portion of the head 20.

Figure 2:
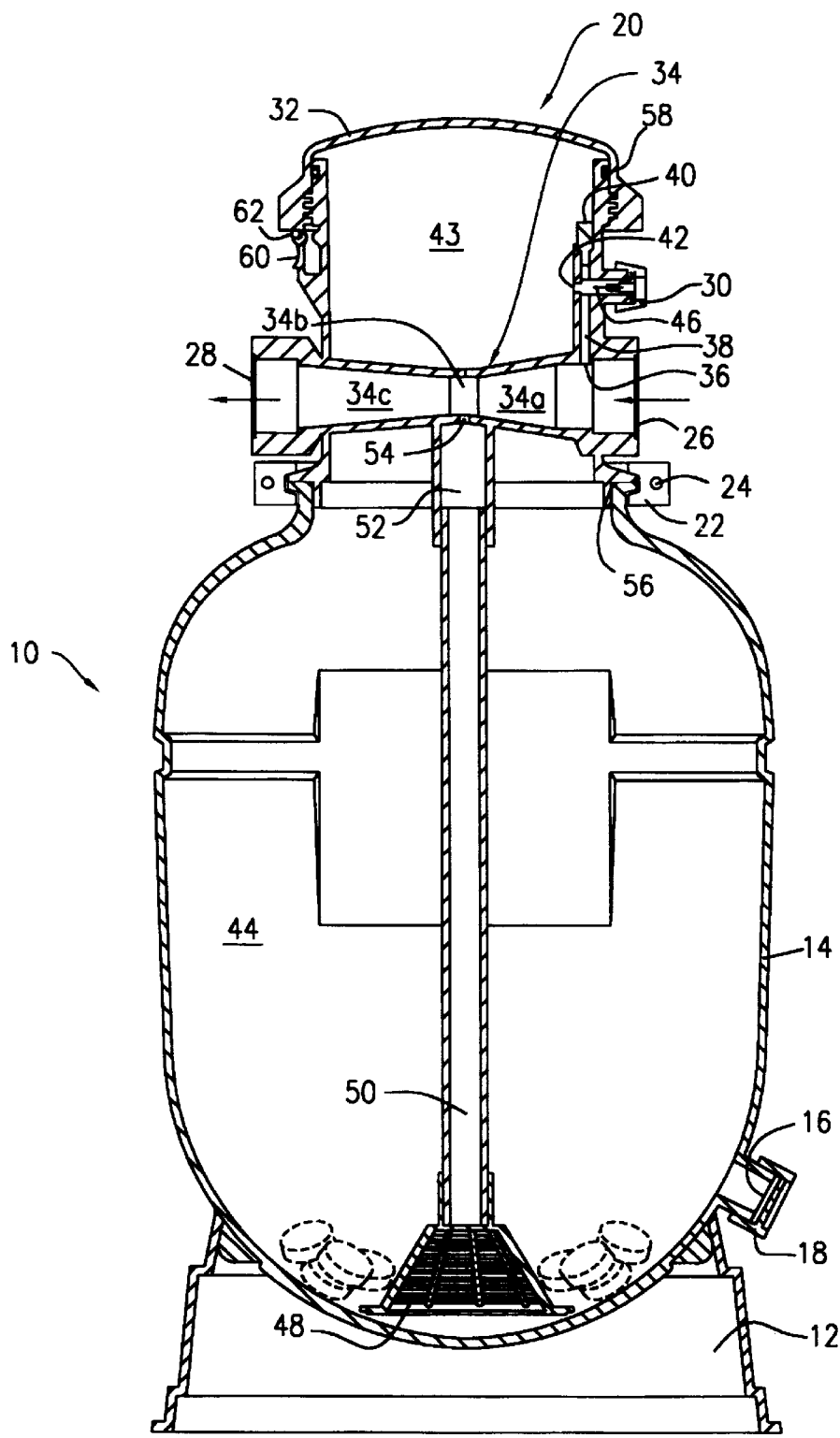
FIG. 2 is a cross-sectional view of the chemical feeder shown in FIG. 1.
Figure 3:
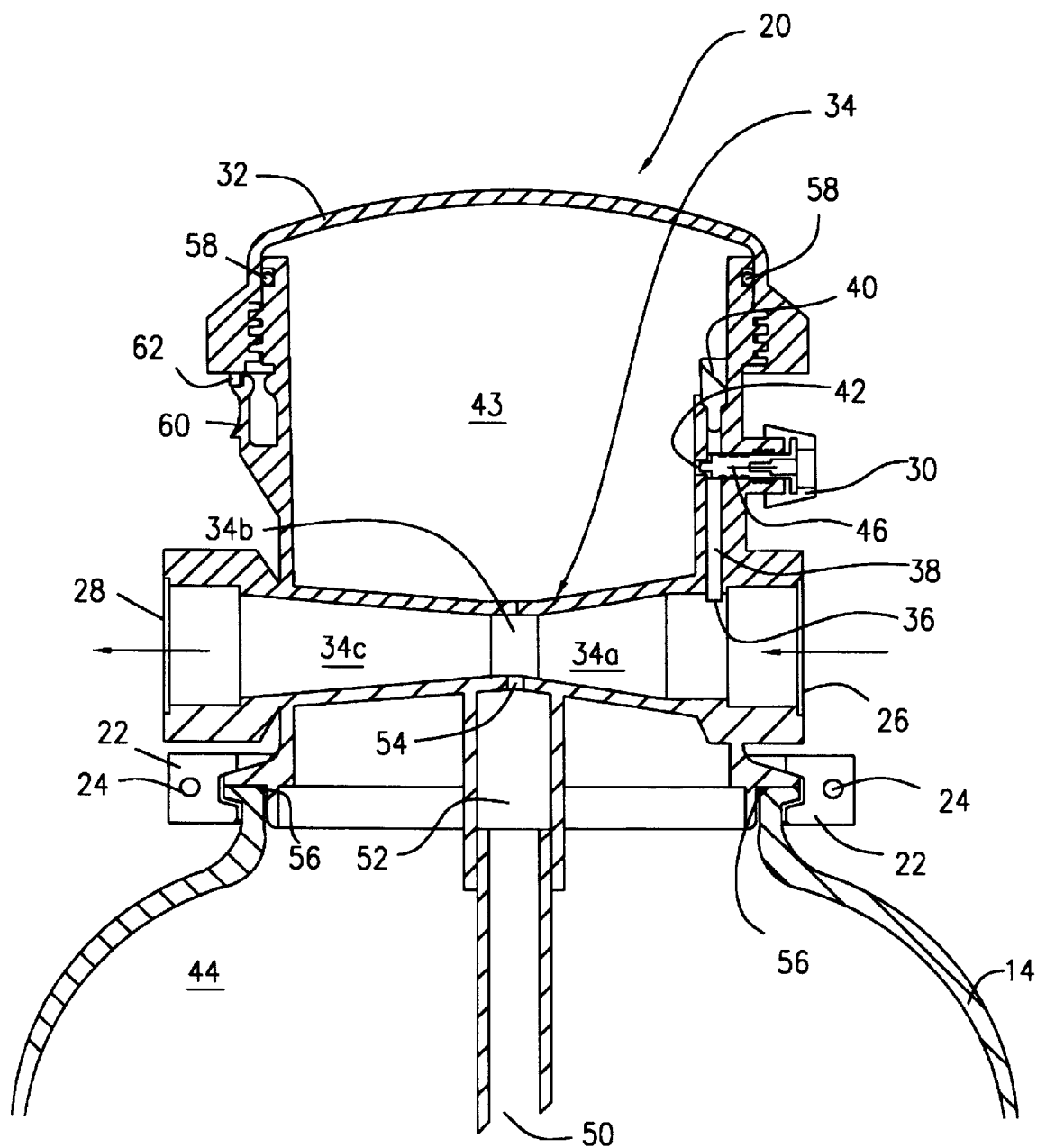
FIG. 3 is an enlarged cross-sectional view of the upper portion of the chemical feeder shown in FIG. 1.

Referring now to FIGS. 2 and 3, a venturi-like flow passage 34 extends completely through the head 20, connecting the inlet 26 to the outlet 28. The flow passage 34 is composed of three distinct sections: a frusto-conical inlet section 34a, a cylindrical section 34b, and a frusto-conical outlet section 34c. A bypass opening 36 is located in the upper portion of the frusto-conical inlet section 34a, near the inlet 26. The bypass opening 36 leads into a bypass passage 38, which is capped by a plug 40. A bypass outlet 42 permits fluid communication between the bypass passage 38 and an interior 43 of the head 20, which opens into an interior 44 of the body 14. A valve 46 controls the flow of fluid through the bypass passage 38 and into the head interior 43 by rotatably engaging the bypass outlet 42.

A strainer 48 is positioned adjacent to the bottom of the body interior 44. One end of a stand pipe 50 is inserted into the strainer 48 with the other end of the stand pipe 50 inserted into a feeder tube 52. A feeder nozzle 54 provides fluid communication between the feeder tube 52 and the cylindrical section 34b of the flow passage 34.

A head O-ring 56 (shown compressed) is positioned between the upper edge of the body 14 and the lower portion of the head 20, to provide a water-tight seal between the body 14 and the head 20. A cap O-ring 58 is seated in the upper portion of the head 20, to provide a water-tight seal between the head 20 and the top cap 32. A safety tab 60, integrally molded with the head 20, releasably engages a downwardly projecting detent 62 on the top cap 32 to lock the top cap 32 in its closed position.

The use of the flange clamp 22 allows the head 20 to be attached to the body 14 without the use of glue or other adhesive material. This is advantageous because adhesive materials may become decayed by the presence of concentrated caustic chemicals which would normally be contained within the body 14.

In operation, the chemical feeder 10 is connected to a water circulation system. The top cap 32 is unscrewed and removed from the head 20, chemical tablets (e.g., chlorine tablets in a swimming pool water circulation system) are placed into the body interior 44 (shown in phantom in FIG. 2), and the top cap 32 is then reattached to the head 20. When water is circulated through the system, it enters the head 20 through the inlet 26 and flows into the frusto-conical inlet section 34a of the flow passage 34. A small portion of the water flow in the frusto-conical inlet section 34a is diverted into the bypass passage 38 via the bypass opening 36. The water in the bypass passage 38 then flows into the head interior 43 through the bypass outlet 42 and down into the body interior 44, wherein it mixes with the chemical tablets, forming a concentrated solution in the body interior 44. The amount of water flowing into the body interior 44 is controlled by rotating the valve knob 30, which adjusts the location of the valve 46 within the bypass outlet 42.

The shape of the frusto-conical inlet section 34a increases the velocity of the water flowing through the flow passage 34, and by the Venturi effect creates a low pressure condition within the cylindrical section 34b. This low pressure condition, in turn, results in a suction force at the feeder nozzle 54. This suction force draws the concentrated solution in the body interior 44 through the strainer 48 and into the stand pipe 50. The concentrated solution then passes through the stand pipe 50, into the feeder tube 52, and into the cylindrical section 34b through the feeder nozzle 54, whereby the concentrated solution is mixed with the water flowing through the flow passage 34. The velocity of the mixture decreases as it flows through the frusto-conical outlet section 34c and out of the chemical feeder 10 through the outlet 28.

By locating the point of mixture of the concentrated solution and the circulated water in the head 20 of the chemical feeder 10 instead of in the lower portion of the body 14, the prior art backflow problem is reduced. The reason for this is that the pressure head created by the less-concentrated water column on the more-concentrated solution has no effect on the point of mixture, since the point of mixture is located above the pressure head. An additional advantage of this aspect of the present invention is that use of a check valve, placed upstream of the chemical feeder 10, may be eliminated.

It will be understood that the embodiment described herein is merely exemplary and that a person skilled in the art may make many variations and modifications without departing from the spirit and scope of the present invention. For instance, a universally-sized head could be used, which would allow the same head to be attached to bodies of various sizes and would allow the same head to be used in a variety of applications. This, along with other such variations and modifications, is intended to be included within the scope of the invention as defined in the appended claims.

We claim:

1. A chemical feeder for dispensing a solution of an additive chemical into a fluid, comprising:

a hollow body including an open upper end and an interior having a bottom, said hollow body capable of accommodating the additive chemical therein;

a substantially hollow head attached to said upper end of said body, said head including an interior communicating with said interior of said bottom;

a flow passage extending horizontally through said head, said flow passage including a frusto-conical inlet section converging to a cylindrical center section, and a frusto-conical outlet section diverging from said center section;

a bypass port communicating with said flow passage at one end and with said interior of said hollow head at the other end, with an adjustable valve disposed between said one end and said other end to control the volume of fluid flowing through said bypass port;

a feeder opening in a lower portion of said center section through which fluid from said hollow body can enter said flow passage; and a feeder tube attached to said flow passage in communication with said feeder opening, said feeder tube extending downwardly toward said bottom of said body from said feeder opening, said flow passage acting as a Venturi to create a low pressure in the fluid flowing therethrough proximate said feeder opening, said low pressure drawing the solution of the additive chemical contained within said hollow body upwards through said feeder tube against the force of gravity to merge into the fluid flowing through said flow passage and be carried out said outlet section.

2. A chemical feeder according to claim 1, wherein the additive chemical is in solid form and dissolves in the fluid at a predetermined rate, said chemical feeder further comprising a strainer disposed over an inlet end of said feeder tube distal to said flow passage, said strainer preventing particles of the additive chemical in the solid state from entering said feeder tube.

3. A chemical feeder according to claim 1, further comprising a base, said body being supported on said base.

4. A chemical feeder according to claim 1, further comprising a downwardly directed drain outlet attached to said hollow body proximate to said bottom thereof, and communicating with the interior of said hollow body, said drain outlet having a selectively openable closure thereon which when opened permits fluid contents of said hollow body to drain therefrom.

5. A chemical feeder according to claim 1, wherein said head has a removable cap for permitting the additive chemical to be inserted in said chemical feeder.

6. A chemical feeder according to claim 5, wherein said head is releasably attached to said upper end of said body by a flange clamp, and said head includes a safety tab, said cap having a downwardly projecting detent, said cap being threadedly attached to said head, and said detent engaging said safety tab such that said cap is locked when in a closed position on said head.

7. A chemical feeder according to claim 6, further comprising a first O-ring positioned between said upper end of said body and a lower edge of said head, and a second O-ring positioned between an upper portion of said head and said cap.

8. The chemical feeder of claim 1, wherein said bypass port has a bypass opening in an upper portion of said inlet section, a bypass passage extending upwardly from said bypass opening to a bypass outlet into said interior of said head.

9. A chemical feeder according to claim 8, further comprising an elongated stand pipe having an upper end connected to said feeder tube and a lower end connected to said strainer.

* * * * *